April 28, 1931. W. SAUTTER 1,802,672
HYDRAULIC OIL DISPENSING SYSTEM
Filed Aug. 16, 1929 2 Sheets-Sheet 1
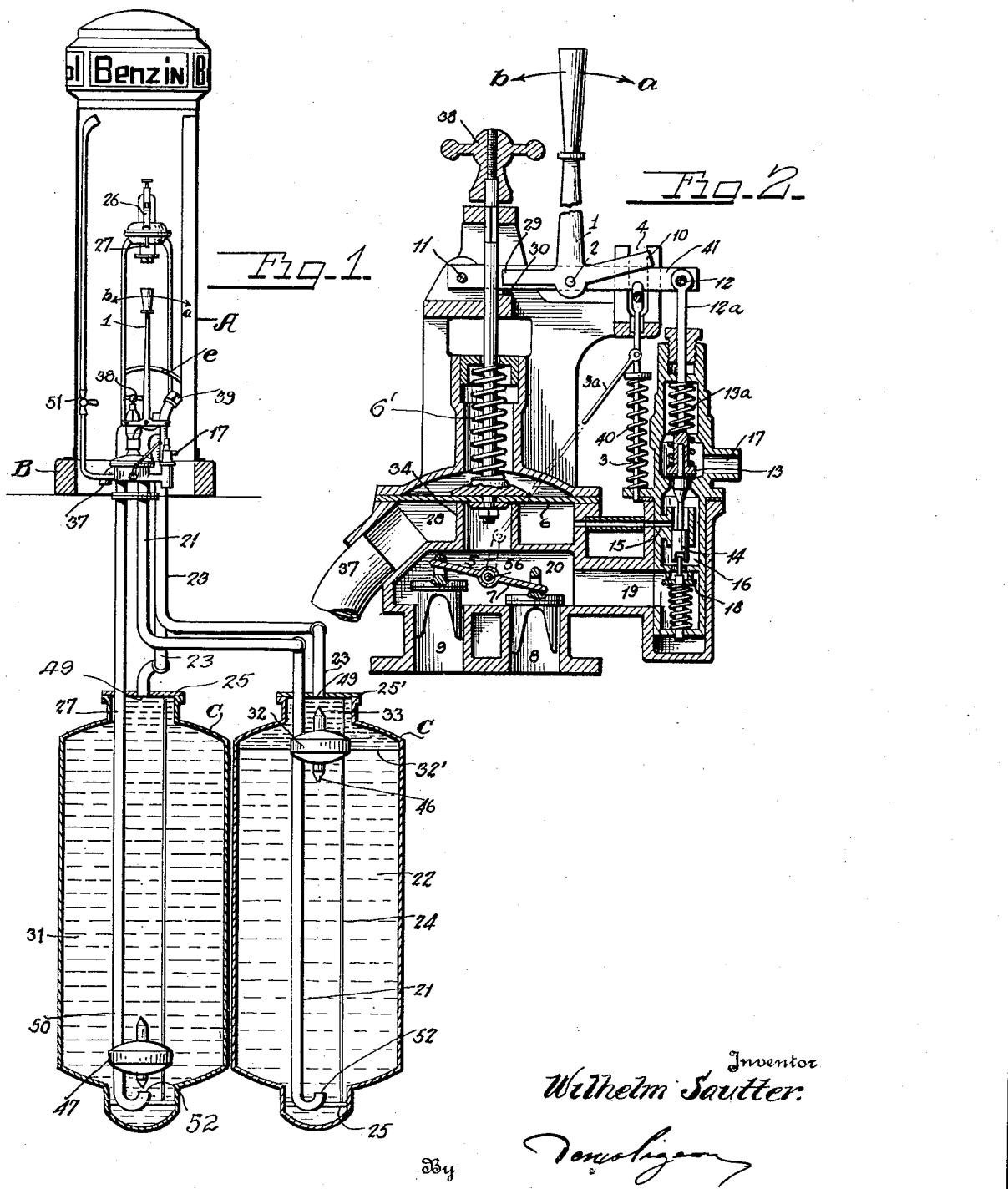
Inventor
Wilhelm Sautter
By
Attorney

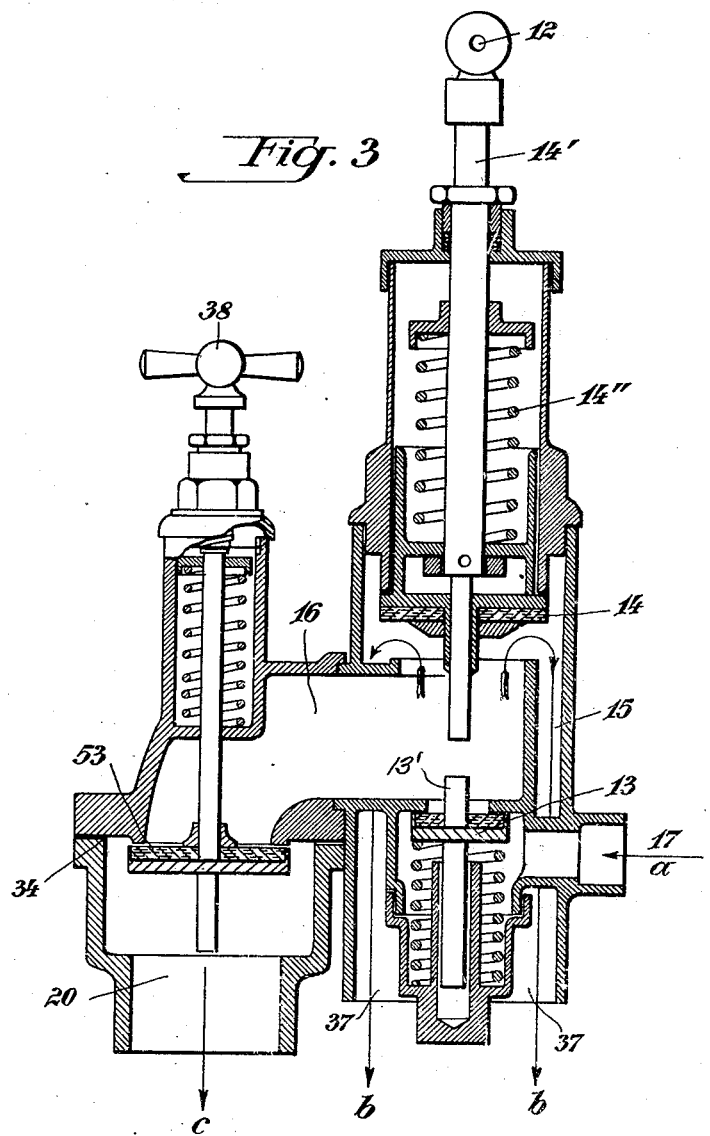

Patented Apr. 28, 1931

1,802,672

UNITED STATES PATENT OFFICE

WILHELM SAUTTER, OF EMMENDINGEN, NEAR FREIBURG, GERMANY

HYDRAULIC OIL-DISPENSING SYSTEM

Application filed August 16, 1929, Serial No. 386,388, and in Germany August 13, 1927.

The subject of the present invention comprises a hydraulically driven refilling plant for liquids which are lighter than, and can not be mixed with, water, more particularly liquids which are inflammable.

In plants of this kind, which are driven hydraulically, there is always the danger that in the event of the hydraulic shut-off valve not being perfectly tight that the inflammable liquid will continually drip out of the plant. For this reason, the erection of hydraulically driven refilling plants has been forbidden by the authorities.

In accordance with the present invention this disadvantage is eliminated by providing between the device which shuts off the hydraulic piping and the supply or refilling tank, a socalled pressureless space, which before and after every refilling process, is rendered pressureless.

The shut-off device of the hydraulic piping and the device controlling the discharge of the intermediate space are thereby suitably connected to one another, in such a way that when the shut-off device is opened the discharging device is simultaneously closed and vice-versa.

In order to simplify the construction of the refilling plant, it is advisable to combine the discharge canal of the pressureless space with a drain pipe or canal, or to provide a connecting canal between the hydraulic valve and valve chamber which will serve simultaneously, as an hydraulic canal, water drain and as a pressureless space, whereby a discharge valve is provided to serve as a pressure safety valve.

In accordance with a further development of this invention refilling plants can also be made in which there are two tanks, either one of which can be used at a time, both of the tanks being actuated by means of the same control mechanism, so that the liquid can be drawn at will from one or the other of the two tanks.

Further, the scope of the present invention also includes the provision of a simple, safe and cheap safety device for the purpose of preventing the liquid from flowing into the hydraulic piping after the tank has been completely filled with liquid, and also for the purpose of preventing the admission of the delivery mechanism into the plant either of which would nullify the safe working and the fireproof qualities of a refilling plant of this kind.

It is known that for this purpose, parts moving in accordance with the surface of the two liquids, more particularly the float devices, can be used, which when they attain their uppermost or lowermost position, actuate a sealing or closing mechanism.

This inconvenience is eliminated by the use of the new float device, which is absolutely reliable. The reason why the new float device works with certainty is as follows:—In order to allow a float member to float between two specifically different liquids, it must be calibrated precisely. The buoyancy of a float, more particularly between water and benzene, is very small and must, in no instance, at the moment at which it has to do its work, be diminished beyond the weight of a valve cone, and its friction. This is achieved by means of the new device. The entire buoyancy is reserved for pressing against the valve seat, because the float is combined with the valve cone and calibrated accordingly. Knocking is no longer possible, because the entire float cannot be attracted and because, further, its large cross section does not permit of rapid movement.

Since, in accordance with the present invention, the sealing parts are arranged on the float itself, there is no longer any necessity for special stop devices in apparatuses of this kind, and with the exception of the end positions, the sealing parts are at a greater distance from the openings, so that their possibility of being carried away when the flow of liquid in the vicinity of the pipe openings is at all heavy, is excluded.

In order to provide for efficiency in the operation of the tanks, the openings are arranged close to the highest and deepest point of the tanks, the pipe leading to the lower opening being used to guide the float device.

Further, another advantage is the safety obtained in the erection, taking down and adjustment of hydraulically driven refilling plants due to the improved float device.

Further, and in accordance with the present invention, for the better guiding of the float and also for the purpose of preventing the liquid from coming into contact and mixing with the delivery water, the float is provided with a fairly large lateral expansion or with pieces, so that occasion arising lateral projections on the supply tanks can also serve the purpose of guides. Owing to the guide parts being at a fairly great distance from the centre of buoyancy of the float, any danger of the float tipping or canting over is avoided, which would lead to the float becoming stuck.

A plurality of tap pipes can thereby suitably be used, which would of course mean that inside the supply tanks only tap pipes of a small cross section would be necessary.

Finally, if a plurality of guides are used these can be formed in the shape of a rigid closed cage device in which the float is movable in the direction of the guides. By this means, this cage device can be calibrated and regulated easily and exactly before being built into the supply tanks for the purpose of regulating the pressure exerted downwards and upwards in its extreme positions by the float for the purpose of closing the pipe openings. If, for example, the float has not been carefully adjusted there is always the risk of drawing water instead of the supply of liquid, or petrol getting into the drain pipes, when the tanks are being filled. This new device provides for the adjustment being carried out easily and carefully in the workshop, that is to say, outside and independent of the storage tank, so that the closed cage device may be taken completed and inserted into the casing of the tanks.

Cross connecting pieces obviate the use of end pieces for the closed cage device. The lid piece of the supply tank can be used to serve as the upper cross connecting piece.

One preferred form of the present invention is shown, by way of example, in the accompanying drawings.

Fig. 1 is a vertical section through the centre of a complete refilling plant with two storage tanks which can be used as desired.

Fig. 2 is a vertical section through the center of the actuating mechanism.

Fig. 3 is a vertical section through the center of a modified form of the actuating mechanism.

A refilling plant according to the present invention consists of three main parts, namely, the tap pillar A, the water control mounting B and the storage tanks C, C.

In the preferred form of the refilling plant shown in the accompanying drawing, the plant is fitted with two storage tanks, one (31) which is completely filled with suitable liquid, and the other tank (22) which is almost emptied.

The hydraulic pipes leading to the tanks are marked 50 and 21, the tap piping being marked 23 which are connected to the uppermost or lowermost ends of the tanks. The hydraulic pipes 21 and 50 serve at the same time as a guide for the floats 47 and 32, to which are connected directly upon the upper and lower side the conical sealing parts 33 and 46, which fits into the correspondingly shaped openings 49 and 52 located in the hydraulic and tap piping 50 and 23, which they respectively close when the float is in its highest or lowest position.

Within the casing 22 of the supply container is located the float 32, provided with the tow sealing cones 33 and 46. The float is guided laterally by guides 21 and 24, one guide piece consisting of the feed pipe 21 for the delivery liquid. The upper end of the pipe 23 communicates with a branch 39 through which the benzine is supplied into the tanks.

The closing cage device consists of the plates 25 and 25', which constitutes at the same time the lid for the tanks.

The tap pipe 23 is connected at 49 to the upper part of the supply container and adjacent is provided the hydraulic pipe 50 with its opening 52.

If the lever 1, which is movably mounted at 2 (Fig. 2) is moved in the direction shown by the arrow $a$, it will, by means of its arm 10 press downwards into the guide slits 4 the valve control rods 3 and 3A, the first mentioned rod being provided with a spring 40, thus setting into motion the lower lever 5 and with it at the same time the axle 56. The arm 7 which is secured to this axle will actuate and reverse the valves 8 and 9.

If the lever 1, when the lever arm 10 presses the valve control rods, is drawn further in the direction indicated by arrow "$a$", it will raise the valve lifting lever 41 which is pivotally mounted at 11, thus causing the latter to raise at 12 the valve spindle 12$a$ and open the water valve 13, which is controlled by the pressure of a spring 13$a$. At the same time, however, the piston 14 which is arranged as an extension of the valve spindle 12$a$ is also raised and, consequently, the canal or vent passage 15 is closed. The space 16 is now under pressure but it becomes pressureless again after the piston 14 returns in its original position and the canal 15 opened.

Thus, owing to the movement of the lever 1, in the direction towards "$a$", the water entering at 17 comes first of all into the space 16, then passes through the non-return valve 18 into the canal 19 and then into the valve chamber 20, where, by means of the valve 8 which has been opened by the control rods 3, it is pressed through the pipe 21 (Fig. 1)

towards the fuel tank. The result is that it displaces the fuel, which can then flow through the pipe 23, through the measuring clock 26, and be drawn off at the outlet 37. When the lever 1 has been pulled back into its rest position, the control rod 3 is released and is pushed upward by its spring 40, and the valves 8 and 9 are again reversed.

If the fuel in the other tank is tapped, the lever 1 is moved in the direction towards $b$. In that position it presses by means of the arm 29, against the fixed point 30, thus raising the valve lifting lever at 12 and opening the water valve 13. The water passes through the valve 9 and the pipe 50 (Fig. 1) into the tank 31, and it presses the fuel towards the outlet 49 where the quantity desired may be drawn-off in the same manner as above described.

Thus, according to the position of the lever, one or the other fuel tank can be drawn from.

If, finally, the fuel has been tapped, the tank of course becomes filled with water and the float 32, which floats on the surface of the water, has now reached its highest position and, by means of its upper valve-cone, closes the opening of the pipe 23, with the result that water cannot be delivered instead of fuel and that, on the other hand, a safety device hereinafter described is provided through which water flowing towards the tank is led out into a drain or into the open thus, eliminating pressure of the water into the tank.

As soon as the float has closed the pipe 23, the pressure in the tank is of course at once increased owing to the water flowing into said tank and it will finally attain the same pressure as that of the main supply pipe. In order to avoid this, provision is made for an over-pressure device. This comprises a rubber diaphragm 6 (Fig. 2) which is controlled by means of pressure spring 6'. If the pressure exerted by the spring is overcome by the increasing pressure of the water, the diaphragm 6 rises from its seat 34 and allows the incoming water to escape through the space 28, and flow into the drain pipe or canalization 37. When, on the return of the lever 1, the influx of water ceases, the diaphragm, in obedience to the pressure of its controlling spring closes the opening at 34.

If the storage tank 22 is to be filled up again, then, after securing the tank supply wagon hose or pipe to the filling inlet branch 39, the lever 1 is pushed over in the direction of the arrow "$a$", thus opening the valve 8 corresponding to the tank 22. Now, by turning the handle 38 towards the right, the diaphragm 6 is lifted from its seat 34 and by this means, the water in the tank 22 will be removed through drain 37, as it is displaced by the fuel entering at 39. In order to fill the tank 31 again, the lever 1 must be brought into a vertical position, that is to say, into the position of rest, because when the lever is in this position, the valve 9 is open and allows the water in the tank 31 to be removed.

When nearly all of the water has been displaced by the incoming fuel, the float 47 in the tank 31 has reached its lower level and, by means of its lower valve cone, closes the pipe 50. From this moment onwards no more water can be drained and the influx of the fuel out of the supply tank wagon ceases.

Absolute safety is ensured by providing the float with an upper and lower valve-cone. When the float is in its lowermost position, it prevents the tank from becoming overfilled, and when it is in its highest position, water can never be delivered instead of fuel. Moreover it also actuates an overpressure safety device which prevents any undue pressure in the tank.

After the cock 51 has been opened, the water level in the tank can readily be seen on a gauge.

A pressureless space can also be created by making a small boring or opening between the water inlet valve 13 and the nonreturn valve 53, (see Fig. 3) that is to say, in the pipe length 16. The space in this pipe length is thus rendered pressureless, although there is accompanied the disadvantage that a loss of water is incurred at each tapping process, and that, in the event of the water valve 13 becoming jammed, the large quantity of water which would then flow in can no longer escape.

The modified form shown in Fig. 3, works in correspondingly the same manner as in the form shown in Fig. 2. Here, the pressureless space 16 is provided in the waterway in which is provided the water inlet and outlet, and the valve 14 which closes the pressureless space 16 during the period of tapping is substituted for the diaphragm 6.

In this figure, the arrows indicate the direction of flow of water, the arrow, "$a$" indicating the hydraulic water intake, the arrow "$b$" the path of the waste water towards the drain or canalization and the arrow "$c$" the path of the water to the storage tank.

The method of operation is as follows:— If the valve rod 14' is moved downwards, the valve 14 with its guide-parts and the spring 14'' is pressed onto the valve seat, thus making the space 16 watertight, which up to now has been pressureless. Owing to the further descent of the valve rod 14' an initial tension is imparted to the spring 14'', and the lower end of the valve stem 14' comes into contact with the stem 13' of the hydraulic water valve 13 and opens it. In this way the water is led to the tanks containing the fuel and it displaces said fuel from same, which fuel, as already mentioned, passes through a measuring device into the tank of the vehicle or automobile.

If during the tapping process, a pressure above that of the atmosphere occurs which is dangerous for the tanks, the tension of the spring 14″ is overcome, the valve 14 opens, and water can escape through the drain or canal 37 the valve 14 thus acting as a safety valve.

When the valve rod 14′ ascends into its upper original position, the hydraulic water valve 13 is first closed. Thereupon, the valve 14 opens and the space 16 again becomes pressureless. When the storage tanks are being filled, the non-return valve 53 is opened by means of the handle 38, so that the water can flow through the pressureless space 16 and into the drain or canal 37.

The use of multiple-way cocks will allow of several kinds of fuel being tapped with one single water controlling device.

I claim:—

1. An hydraulically driven refilling device for liquids of the character described, comprising in combination, a valve chamber; connecting means between said chamber and a suitable water supply under pressure; a valve located within said connecting means; means for opening said valve manually; a tank for said liquid; a water pipe extending vertically through said tank and bent upwardly at its lower end adjacent the bottom of the tank; another pipe extending from the top of the tank to a point above the said tank; a float lighter than water but heavier than the liquid in said tank adapted to operate vertically up and down; and valve-cones on the top and bottom of said float adapted to close alternately the open end of each of said pipes.

2. An hydraulically driven refilling device for liquids of the character described, comprising in combination, a valve chamber; connecting means between said chamber and a water supply under pressure; a valve located within said connecting means; means for opening said valve; a tank for said liquid; a water pipe extending vertically through said tank and bent upwardly at its lower end adjacent the bottom of said tank; another pipe extending from the top of said tank to a point above said tank; a float lighter than water but heavier than the said liquid mounted in said tank adapted to freely move vertically up and down; valve-cones on the top and bottom of said float adapted to alternatively close the open ends of said pipes; a disk connected to said float extending across the inner side of said tank; and means for guiding said float and disk vertically.

3. An hydraulically driven refilling device for liquids of the character described, comprising in combination, a valve chamber; connecting means between said chamber and a water supply under pressure; a valve located within said connecting means; a vent passage connecting said connecting means to a suitable drain; a splindle extending upwardly from said valve; a spring adapted to close said valve; means upon said valve to control said vent passage; means for opening said valve; a second chamber and means connecting same to the first mentioned chamber; a valve in said connecting means between said two chambers whereby the communication is closed when said spindle is lifted; an outlet opening in said second chamber; a tank for said liquid; a pipe terminating at the bottom of said tank at one end and at its other end connected to said chamber; a valve controlling said pipe; and another pipe extending from the top of the tank leading to a suitable place of delivery.

4. An hydraulically driven refilling device for liquids of the character described, comprising in combination, a valve chamber; connecting means between said chamber and a water supply under pressure; a valve located in said connecting means; a vent passage connecting said connecting means to a suitable outlet opening; a spindle extending upwardly from said valve; means adapted to close said valve; resilient means upon said valve to control said vent passage; means for opening said valve; a second chamber and connecting means between said chamber; a valve adapted to close said connecting means upon lifting of said spindle; an outlet opening in said second chamber; a tank for said liquid; a pipe terminating at the bottom of said tank at one end and at its other end connecting said first mentioned chamber; and a valve controlling said pipe.

5. An hydraulically driven refilling device for liquids of the character described, comprising in combination, a valve chamber and an outlet opening in said chamber; connecting means between said chamber and a water supply under pressure; a valve located within said connecting means, means to close said valve, a second chamber having an outlet opening; means connecting same to said first mentioned chamber, a diaphragm valve adapted to close said connecting means; a tank for said liquid; a pipe terminating at the bottom of said tank at one end and at its other end connected to said outlet opening in said first mentioned valve chamber; a valve in said outlet opening; means to actuate said valves in said connecting means and in said outlet opening; means to lift said diaphragm; a vent passage connecting said second mentioned chamber to said water supply connecting means; and means upon said valve controlling said water supply to control said vent passage.

In testimony whereof I affix my signature.

WILHELM SAUTTER.